(No Model.)
J. B. ROOT.
PIPE.
No. 335,631. Patented Feb. 9, 1886.
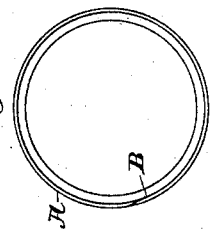
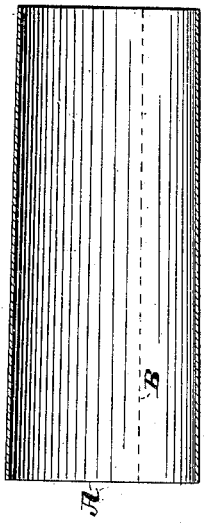
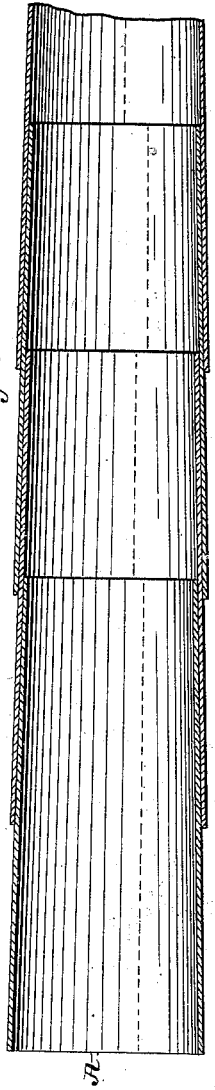
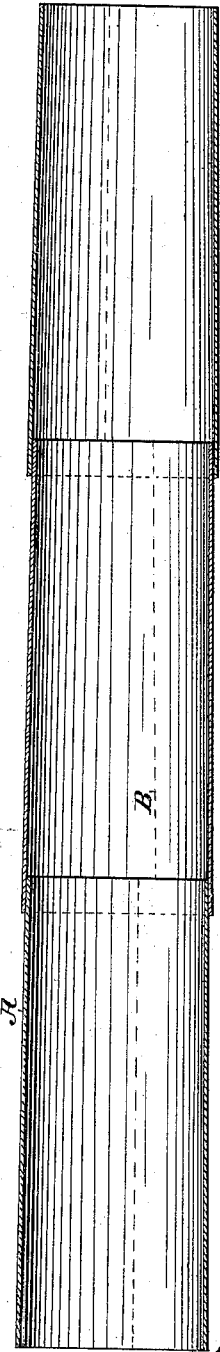
Witnesses:
Robt. H. Duncan,
R. F. Gaylord.
Inventor:
John B. Root
by
Saml. A. Duncan
atty.

UNITED STATES PATENT OFFICE.

JOHN B. ROOT, OF PORT CHESTER, NEW YORK.

PIPE.

SPECIFICATION forming part of Letters Patent No. 335,631, dated February 9, 1886.

Application filed October 5, 1885. Serial No. 178,997. (No model.)

*To all whom it may concern:*

Be it known that I, JOHN B. ROOT, of Port Chester, in the county of Westchester and State of New York, have invented certain new and useful Improvements in Metal Pipes; and the following is a full, clear, and exact description thereof, reference being had to the accompanying drawings.

The invention relates to that kind of pipe or tubing that is made up of separate sections consisting of sheet-metal blanks bent into proper shape and having their adjoining edges fastened together; and the invention is particularly applicable in making the largest sizes of this kind of pipe—such, for example, as is used in mining, irrigating, and for conducting water to and distributing it in cities.

One method of making such pipe is to form the plate or sheet metal of which the pipe is made into slightly conical sections having longitudinal riveted seams, one end of such a section being sufficiently smaller than the other end, so that a number of the sections can be connected into a continuous line of pipe by simply forcing the small end of each section into the large end of another section, and so on to any desired extent. There are various objections connected with pipe thus made, and they are, first and particularly, that the edges of the blanks composing the sections are overlapped in order to be riveted together, and hence they make a very imperfect joint when their ends are inserted in each other, due to the lap preventing a tight fit of the parts, and this objection is augmented by the projecting heads and shanks of the rivets. Again, punching the blanks so as to fasten their edges together by means of rivets materially weakens the blanks, and the riveting process is slow, and hence limits the rate and increases the cost of production.

My invention has for its purpose to obviate these objections; and it consists in a metal pipe composed of sections, which are made from blanks shaped into conical form and welded together along their longitudinal edges, so that they are circular in cross-section, such sections being united by inserting the small end of each section into the large end of an adjoining section.

In the drawings, Figure 1 is a longitudinal section of a pipe-section made in accordance with my invention. Fig. 2 is an end view of the same from the left of Fig. 1. Fig. 3 shows a continuous length of pipe made from such sections, and Fig. 4 shows a like view of pipe, but of double the thickness of that of Fig. 3.

In these views, A represents a pipe-section made of a blank of plate or sheet metal. This blank is bent into the conical form of Fig. 1, and its edges are then welded together along a scarfed or other suitable form of seam B, so that the seam will not be left projecting, and so that the section will be circular in cross-section. These sections may be then forced together to form a continuous length or lengths of pipe, the small end of each section being driven or otherwise forced into the large end of its connecting section, as seen in Fig. 3; or the disconnected sections may be shipped to the place where the pipe is to be used, and there forced together, either in the ditch where they are to remain, or into convenient lengths of pipe, which in turn may be forced together when laid in the ditch, as in the case of separate sections.

In Fig. 4 I show the sections forced half-way through one another, so that the body of the pipe is twice the thickness of the sections composing it. A pipe of three times the thickness of its sections may obviously be produced by forcing the sections two-thirds of the way through one another.

With this construction of pipe-sections pipe may be made tight at the joints, for the sections being circular can be forced together so as to entirely close the ends of one another, and this, too, without calking or otherwise fastening the adjoining ends of the sections together. It is well, however, to apply a corrosive or other paint to the ends of the sections, so as to insure perfect contact of the surfaces brought together; but calking or packing the joints, as ordinarily practiced, is unnecessary. Again, pipe made this way is stronger than the same weight of riveted pipe commonly used for this purpose, because the edges of the blanks can be welded together so that the seam formed will be as strong as any other part of the section, and hence lighter and cheaper material can be used than would be required were the seams riveted. Furthermore, welded pipe can be made cheaper and faster than riveted pipe.

I show a machine particularly adapted to making the above-described pipe in an application for United States Patent filed by me on June 27, 1885, No. 170,020, allowed August 15, 1885. This machine consists, briefly, of a fixed clamp of proper shape to hold the blanks when brought into the conical form of the sections, and devices for heating and welding, which are arranged to move along the edges of the blank and heat such edges and weld them together. With this machine welded pipe-sections can be rapidly and more economically made than can riveted sections suitable for the same work.

What is claimed as new is—

The herein-described metal pipe composed of conical sections connected by the small end of each section being forced into the large end of an adjoining section, such conical sections being formed from blanks whose longitudinal edges are welded together so that the sections are circular in cross-section, whereby the sections when inserted in each other will fit closely and form tight joints, substantially as set forth.

JOHN B. ROOT.

Witnesses:
R. F. GAYLORD,
ROBT. H. DUNCAN.